United States Patent [19]

Wurtz

[11] Patent Number: 5,011,076
[45] Date of Patent: Apr. 30, 1991

[54] PNEUMATIC TEMPERATURE CONTROL

[76] Inventor: Ike Wurtz, R 2, Box 105, Wecota, S. Dak. 57438

[21] Appl. No.: 480,848

[22] Filed: Feb. 16, 1990

[51] Int. Cl.⁵ ............................................. F24F 13/08
[52] U.S. Cl. ...................................... 236/49.4; 236/86
[58] Field of Search ...................... 236/49.4, 86, 99 G, 236/99 R

[56] References Cited

U.S. PATENT DOCUMENTS

| | | | |
|---|---|---|---|
| 1,841,901 | 1/1932 | Mabey | 236/86 X |
| 2,481,395 | 9/1949 | Carns | 236/86 |
| 2,874,924 | 2/1959 | Good | 236/99 G X |
| 3,941,310 | 3/1976 | Travaglio et al. | 236/49.4 |
| 4,643,353 | 2/1987 | Harris | 236/49.4 |
| 4,666,082 | 5/1987 | Spilde | 236/86 |

OTHER PUBLICATIONS

PALS 1985 Hog Catalog, cover page and pp. 19-20, entitled "Thermal-Pneumatic Ventilation Systems", (Exhibit A).
Spilde Manufacturing Brochure, entitled "SAVE Systems TM Thermal Pneumatic Ventilation Systems", 2 pages (Exhibit B).
SAVE SYSTEMS brochure entitled "Installation Procedure—Wall—Vent System", 10 pages, (Exhibit C).

Primary Examiner—William E. Tapolcai
Attorney, Agent, or Firm—Merchant Gould Smith Edell Welter & Schmidt

[57] ABSTRACT

A pneumatic temperature control unit having a fluid receptacle containing a fluid capable of expanding or contracting with temperature. The fluid receptacle having a surface capable of movement in response to expansion or contraction of the fluid in the receptacle. A spring positioned to exert a variable force on the receptacle surface. The variable force being calibrated for the corresponding fluid temperature above which the receptacle surface moves a desired amount. A calibrated temperature scale to adjustably set the variable force permits the receptacle surface to move at the desired fluid temperature. An elongated trigger mounted to transmit movement by the receptacle surface to a module having structure for controlling the flow of air between an air inlet port and an air output port. The air valve structure is in communication with the trigger so that expansion and contraction of the fluid actuates the air valve structure to control the flow of air to operate a pneumatic device and ventilate an area to control its ambient temperature.

2 Claims, 4 Drawing Sheets

PNEUMATIC TEMPERATURE CONTROL

TECHNICAL FIELD

This invention relates generally to the field of temperature control systems, and particularly to a pneumatic temperature control system for controlling pneumatic devices in response to ambient air temperature changes sensed by a control unit.

BACKGROUND

Ventilation devices such as wall ventilators, ventilating curtains, and ridge vents are often manually controlled to regulate the temperature of an enclosed space. U.S. Pat. No. 4,666,082 discloses a temperature control system that automatically controls the operation of ventilation devices through the use of pneumatics. In that patented device, the ventilation devices are operable by changes in air pressure supplied to the devices by a control unit. The control unit has an adjusting knob for presetting the control unit to operate the ventilation devices when the temperature sensed by the control unit is above the preset temperature. However, the control unit is not easily adjusted by the user to set a specific temperature desired by the user because the control unit cannot be easily calibrated to specific temperature settings.

The present invention allows the user to preset a specific temperature desired by the user above which the pneumatic devices of the temperature control system will operate. This allows a building, typically a livestock containment building, to be ventilated and maintained at a predetermined temperature. Adjustments can be easily made to control the ambient temperature in the building.

These and other advantages of the invention over the prior art will become more apparent after reading the description and claims which follow.

SUMMARY OF THE INVENTION

This invention is a pneumatic temperature control unit having a frame with a fluid receptacle mounted to the frame. The fluid receptacle contains a fluid capable of expanding or contracting with temperature. The fluid receptacle has a surface capable of moving in response to expansion or contraction of the fluid in the receptacle. The control unit also has a spring positioned to exert a force on the receptacle surface. The spring is adjustable to vary the force which it exerts on the receptacle surface. The variable spring force is calibrated for the corresponding fluid temperature above which the receptacle surface will move a desired amount. The calibration of the variable force results in a temperature scale to adjustably set the variable force at a force which permits the receptacle surface to move at the desired fluid temperature. An elongated trigger is mounted to the frame and has a first end which is movable by movement of the receptacle surface. The trigger has a second end which is movable in response to movement of the first end. A module is attached to the frame and has an air valve structure for controlling the flow of air between an air inlet port and an air output port. The air valve structure is in communication with the second end of the trigger so that expansion and contraction of the fluid actuates the air valve structure to control the flow of air to operate a pneumatic device.

The control unit is employed in a temperature control system that has conduit linking a supply of pressurized air to the control unit and conduit linking the control unit to one or more pneumatic devices. These pneumatic devices are operable by changes in air pressure supplied to the device by the control unit through the conduit.

DESCRIPTION OF THE PREFERRED EMBODIMENTS

Throughout the following description, reference will be made to the drawings and the same numerals will be used throughout the several views to indicate the same or like parts of the invention.

Figure 1:
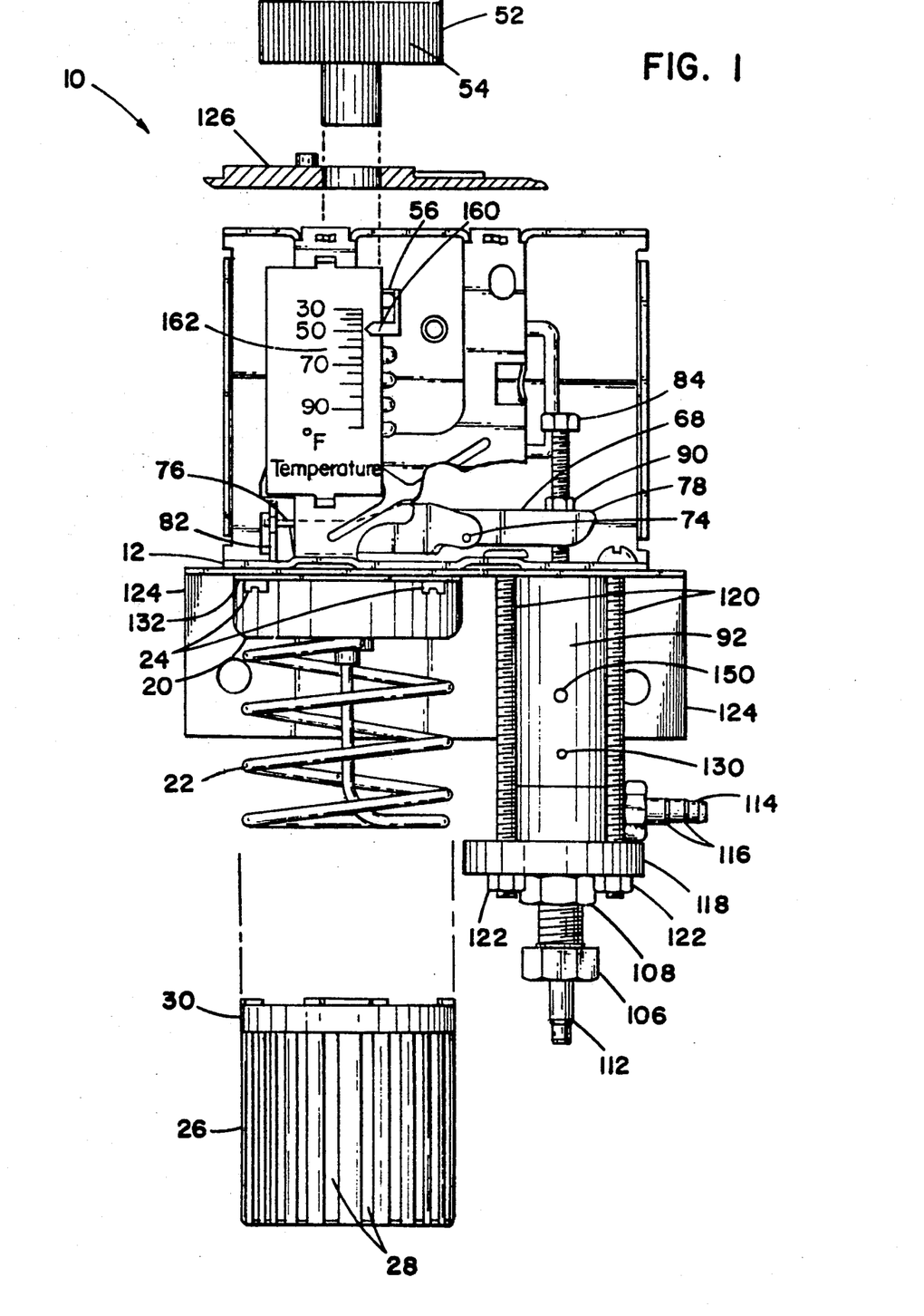
FIG. 1 is a front view of the control unit with the cover removed and a portion of the frame cut away.
Figure 2:
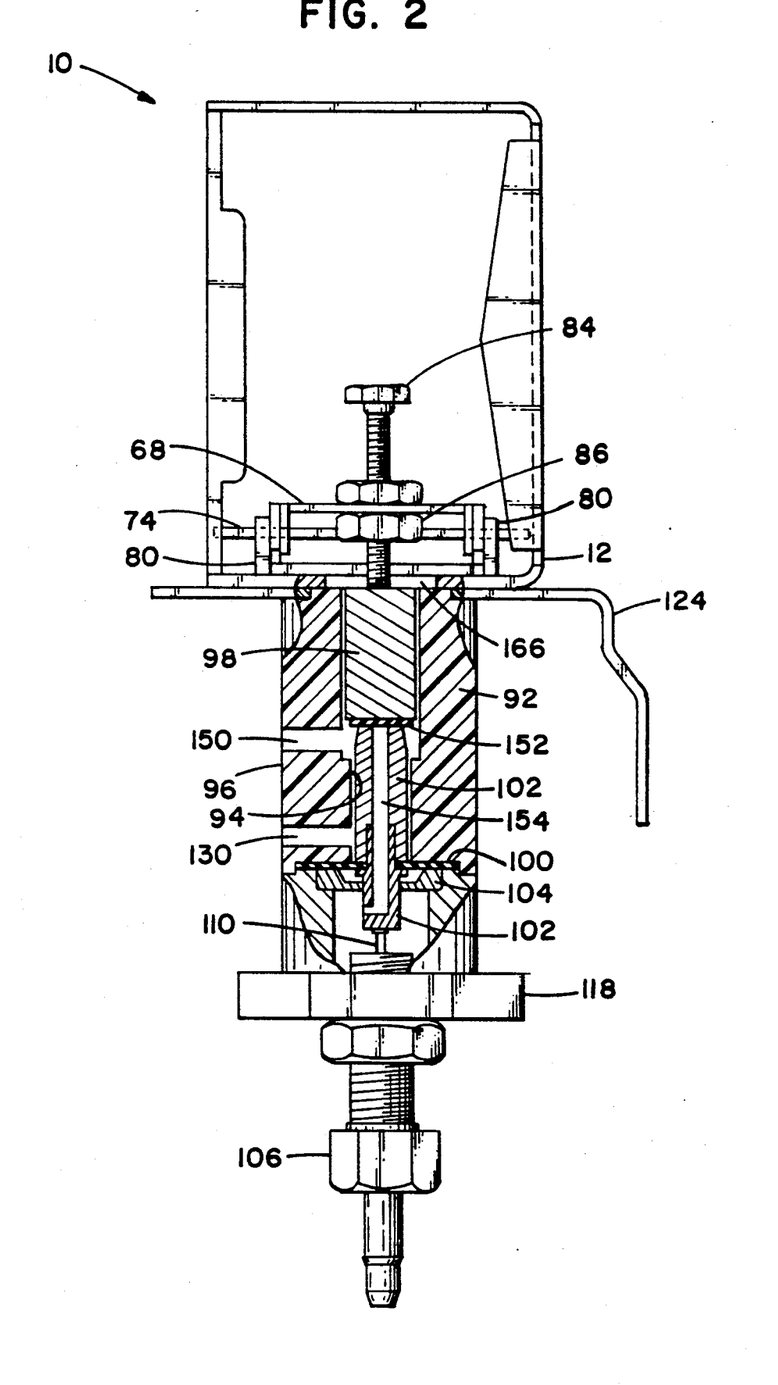
FIG. 2 is a side view of the right side of the control unit shown in FIG. 1 with a portion shown in cross-sectional view.
Figure 3:
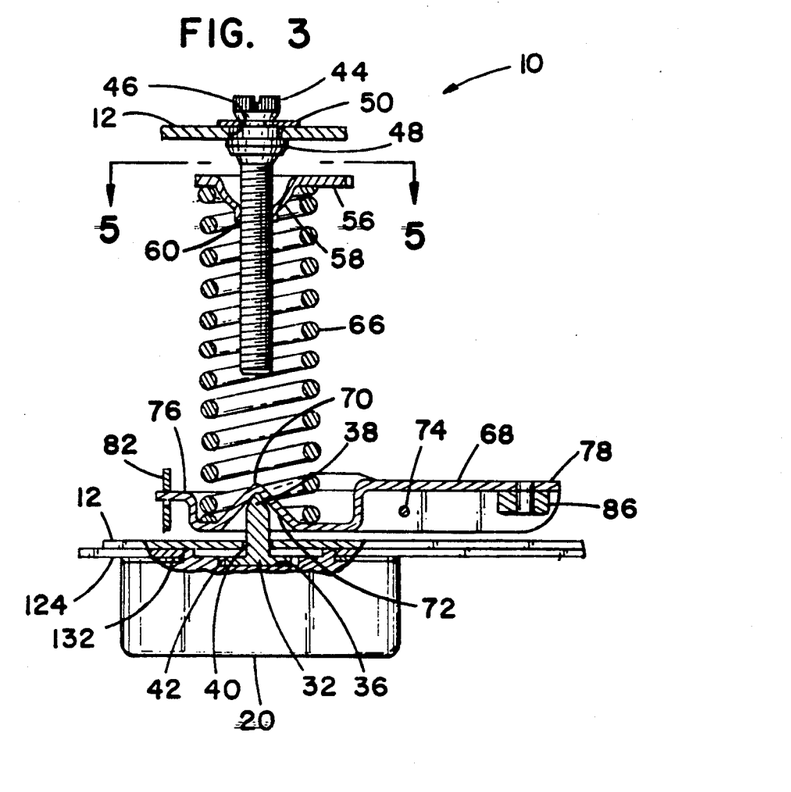
FIG. 3 is a cross-sectional front view of the left side of the control unit shown in FIG. 1 with portions of the control unit removed.

Referring now to FIGS. 1-3, the control unit 10 has a fluid receptacle 20 mounted to a metal frame 12. The receptacle contains a fluid capable of expanding or contracting with temperature. The receptacle has a surface 32 capable of moving in response to expansion or contraction of the fluid in the receptacle. A spring 66 exerts an adjustable compression force on the receptacle surface. An elongated trigger 68 mounted to the frame has a first end 76 which is movable in response to movement of the receptacle surface 32. The trigger has a second end 78 which is movable in response to movement of the first end.

A module 92 is attached to the frame 12 and has a variable air inlet valve 106 and an air output port 114. The airflow through the air output port is dependent upon the displacement of the variable air inlet valve. Movement of the receptacle surface is transmitted by the trigger 68 through the module to the variable air inlet valve. Through adjustment of the variable spring force exerted on the receptacle surface, movement of the receptacle surface can be controlled to only occur when the fluid pressure in the fluid receptacle increases sufficiently to move the surface against the spring force. Through calibration of the variable spring force, the control unit can be set for the temperature above which the fluid must reach to move the receptacle surface to displace the variable air inlet valve.

The fluid receptacle 20 is a sealed unit containing a fluid which is capable of expanding or contracting with temperature. The receptacle is attached to the frame 12 by mounting screws 24 as shown in FIG. 1. The receptacle has an outwardly extending coil 22 filled with fluid. The coil increases the surface area of the receptacle in contact with the ambient air thereby increasing the heat exchange rate between the fluid and the ambient air. The coil is protected by a coil protection cover 26 that has access slots 28 to allow the ambient air to flow around the coil. The coil protection cover is held in place by a locking ring 30 which is sized to slide over the lower end of the cover and tightly grip the upper end of the cover to the receptacle.

The receptacle surface 32 of the fluid receptacle moves in response to expansion and contraction of the fluid, which in FIGS. 1 and 3 would be upward and downward. As shown in FIG. 3, a fluid receptacle needle 34 with a flat disk-shaped base 36 rests in a disk-shaped recess 42 in the receptacle surface 32. A perpendicular tip portion 38 of the needle protrudes up through a hole 40 in the frame. As the receptacle surface moves in response to changes in temperature of the fluid, the tip portion moves upward and downward through the opening in the frame.

As shown in FIG. 3, the control unit has a threaded temperature adjusting screw 44 mounted at the top of the frame 12 and protruding downward through a hole 46 in the frame toward the fluid receptacle needle 34. The temperature adjusting screw is locked from upward movement by a stop ring 48 on the screw which has a larger diameter than the diameter of the hole 40 in the frame. The screw is releasibly locked from downward movement by a retaining ring 50 snapped around the screw. The screw rotates freely in either direction by manual rotation of a temperature adjusting knob 52 attached to the head of the screw. (See FIG. 1). The knob is attached by a small screw which engages internal threads in the head of the temperature adjusting screw (not shown). The knob has ridges 54 on its outer cylindrical surface to provide a better gripping surface for turning the knob by hand to rotate the screw.

Figure 5:
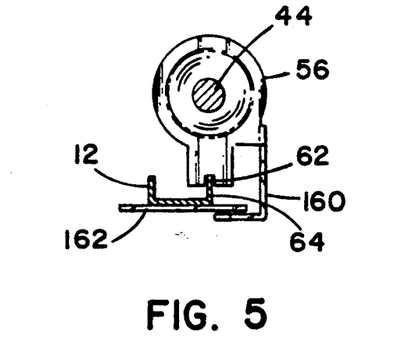
FIG. 5 is a top view of a portion of the control unit shown in FIG. 3 showing the plate and a portion of the frame.

As the screw is rotated by the knob, a plate 56, as shown in FIG. 3, with a threaded aperture 60 slidably engages the threads of the screw and moves longitudinally along the screw. The plate is held from rotating with the screw by an elongated ridge 64 on the frame 12 that runs generally parallel to the longitudinal axis of the screw. (See FIG. 5). The ridge engages a perpendicular notch 62 in the edge of the plate that rides along the ridge as the plate moves longitudinally along the screw.

As best seen in FIG. 3, the cylindrical metal spring 66 with helical coils is positioned longitudinally between the plate 56 and the receptacle surface 32 and surrounds the lower end of the temperature adjusting screw. The top end of the spring engages a lower surface 58 of the plate which is curved outwardly to center the coils of the top end of the spring about the screw. The bottom end of the spring engages an upper surface 70 of the first end of the trigger 68 which rests on the tip portion 38 of the fluid receptacle needle 34. The upper surface 70 of the trigger is curved outwardly to center the coils of the bottom end of the spring about the screw and to maintain the spring in contact with the trigger.

The lower surface 58 of the plate 56 and the upper surface 70 of the trigger 68 compress the spring 66 so that the spring exerts a compression force on the receptacle surface 32 acting to restrain its upward movement in response to expansion of the fluid therein. As the temperature adjusting screw 44 is rotated causing the plate to travel longitudinally along the screw, the compression force exerted by the spring on the receptacle surface varies. Calibration of this variable force controlled through movement of the plate allows the control unit to be preset to achieve the desired movement of the receptacle surface.

The metal trigger 68 is pivotally mounted to the frame 12 by a metal pin 74 which rests in pin mounts 80 on the frame as shown in FIG. 2. The first end 76 of the trigger has a lower surface 72 which is curved inwardly and engages the tip portion 38 of the fluid receptacle needle 34 as best shown in FIG. 3. The curved upper surface 70 of the trigger is directly above the curved lower surface 72. As the fluid in the receptacle expands and contracts with temperature, the fluid receptacle needle will move up and down against the action of the spring. Since the trigger is positioned between the spring and the needle, the first end of the trigger will rotate around the pivot point as the needle moves upwards and downwards. A trigger holder 82 mounted to the frame is provided to limit the range of rotation of the trigger.

The second end 78 of the trigger 68 moves in response to rotational movement of the first end 76. The second end has a threaded nut 86 welded beneath a hole in the trigger. A threaded airflow adjustment bolt 84 is threaded downward through the nut. (See FIG. 1). A locking nut 90 positioned between the head of the bolt and the trigger engages the trigger to maintain the position of the bolt relative to the nut once locked. The airflow adjustment bolt links movement of the trigger to the variable air inlet valve 106 through the module 92. The bolt is adjustably set for the proper height between the trigger and the module during the initial assembly and calibration of the control unit.

The module 92 is made of plastic and has a cylindrical bore with different diameter portions extending longitudinally through the module. The module is mounted to the frame 12 by mounting bolts 120 and nuts 122 which maintain the module between the frame and a metal module end cap 118. As shown in FIG. 2, a cylindrical piston 98 is slidably mounted in the upper end of the module such that a top end is exposed to be engaged by the tip of the airflow adjustment bolt 84 passing through a hole 166 in the frame. A flexible disk-shaped diaphragm 100 is attached along its edge to the interior surface of the module at a lower end of the module. An elongated rod 102 extending through the center of the diaphragm has one end which is engaged by the piston 98 and a second end which engages a valve core 110 of the variable air inlet valve 106 when the rod is forcibly moved downward by the piston. The rod can be made of two pieces with one piece having an externally threaded tip portion and the other piece having an internally threaded cavity. The rod would be assembled with the diaphragm positioned between the two pieces.

The variable air inlet valve 106 extends perpendicularly up through the bottom surface of the end cap 118 toward the rod 102. The air inlet valve is threadly attached to the module end cap and is held in place by a jam nut 108. The air inlet valve is connected to a source of pressurized air by conduit which grips a small barb 112 on the valve to retain the conduit. The valve core 110 of the air inlet valve is displaceable by downward movement of the rod 106 to vary the air flow from the air supply source into the module. A cylindrical guiding ring 104 snapped into the module has an aperture which slidably guides the lower end of the rod 102 during movement. When the valve core is displaced by the rod, the air entering the module will exit the module through the air output port 114 threadedly attached to the end cap 118. The air output port is connected by conduit which grips small barbs 116 on the port to the pneumatic device which is operable by changes in air pressure sent to the device by the control.

Figure 4:
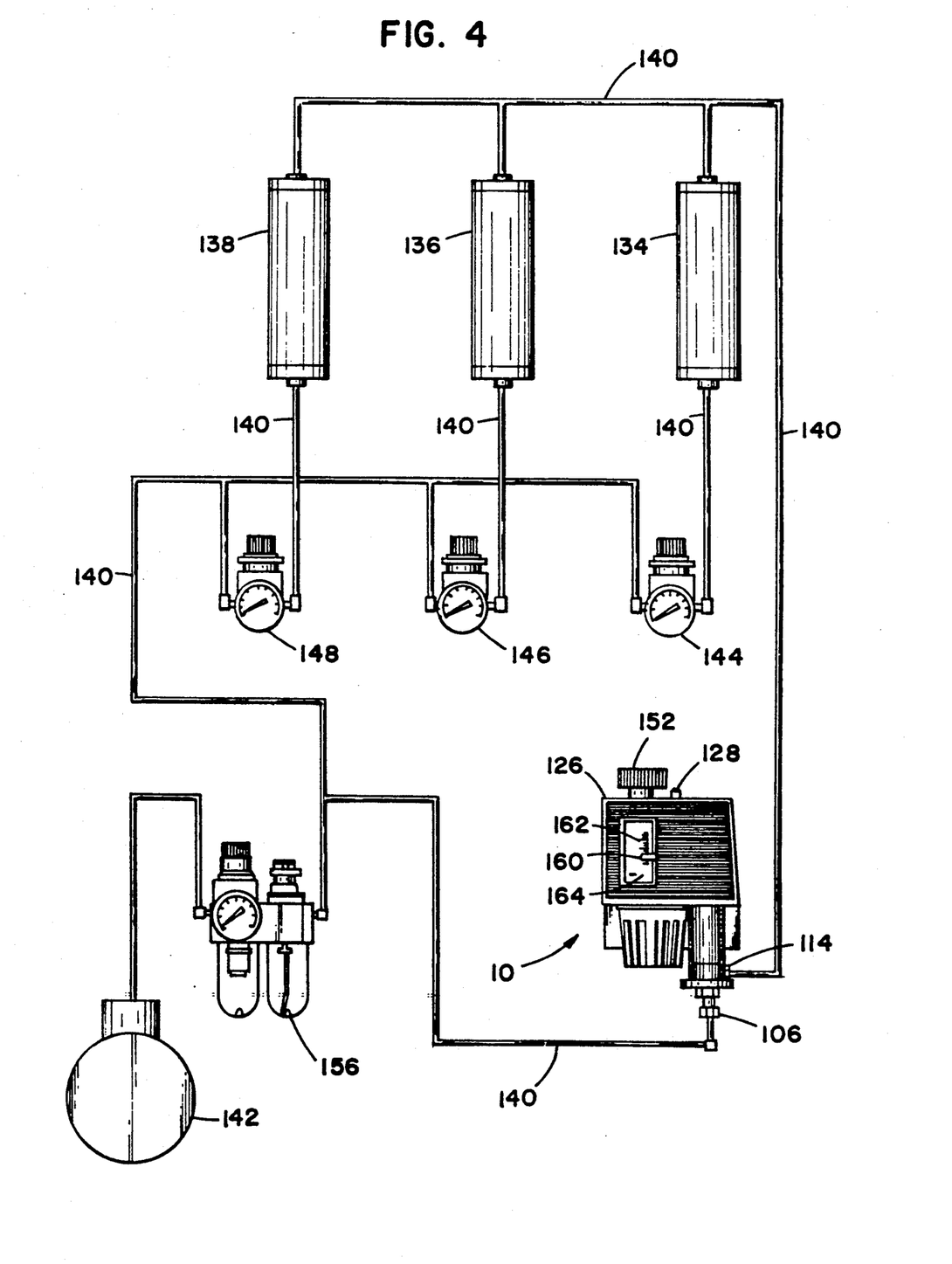
FIG. 4 shows the control unit of FIG. 1 in a temperature control system with pneumatically operated devices connected by conduits to an air compressor.

As shown in FIGS. 1 and 2, the control unit is mountable to a vertical surface by an L-shaped metal mounting plate 124 attached to the frame 12. A plastic cover 126 fits over the upper half of the control unit leaving the temperature adjusting knob 52 exposed. A seal member (not shown) along the bottom edge of the cover engages the mounting member to prevent dust and moisture from entering the control unit. The cover is held in place by a cover retaining screw 128 as shown in FIG. 4. The cover helps to protect the movable components in the control unit from contamination. An o-ring seal (not shown) is provided to seal the control unit against dust and moisture where the temperature adjusting knob extends beyond the cover. A gasket 132 is provided to prevent dust and moisture from entering the control unit between the mounting plate 124 and the fluid receptacle 20. The module has a water drain hole 130, shown in FIGS. 1 and 2, to allow water that may collect in the module to drain from the module.

In operation, the control unit is exposed to ambient air which comes in contact with the coil 22 of the fluid receptacle 20. If the fluid temperature is lower than the ambient air temperature, the fluid in the receptacle 20 gradually reacts by increasing its temperature which increases the pressure of the fluid. If the fluid pressure is greater than the force of the spring 66, the receptacle surface 32 and needle 34 move upward. The first end 76 of the trigger 68 will rotate upward around the trigger pin 74 causing rotational movement of the second end 78 downward. The airflow adjusting bolt 84 is forced downward by the trigger to slidably move the piston 98 downward. The piston forces the rod 102 against the valve core 110. When the valve core is displaced by the rod, air from the air supply source enters the module and exits through the air outlet port 114. The air flow is dependent upon the amount of displacement of the receptacle surface. When the fluid receptacle senses a decrease in temperature, the receptacle surface begins to move downward to permit the rod to move away from the valve core. The rod will only be moved back toward the valve core when the fluid receptacle senses an ambient air temperature increase sufficient to increase the fluid pressure enough move the surface upward against the spring.

Since the receptacle surface 32 will only move upward when the pressure of the fluid exerted on the surface is greater than the spring force, movement of the receptacle surface can be controlled by varying the spring force to only allow movement of the surface when the fluid temperature exceeds a certain preselected temperature. The variable spring force is calibrated by tracking movement of the plate 56 and varying the ambient air temperature. An indicator arm 160 shows the location of the plate relative to a vertical temperature scale 162 added to the frame 12. Movement of the plate is calibrated to the fluid temperature above which is necessary for the surface to move against the spring 66 to actuate the variable air inlet valve 106. Hash marks and numbers are placed on the vertical scale 162 that correspond to the fluid temperature above which the surface moves upward for each spring setting. A window 164 is added to the cover 128 to permit viewing of the temperature scale with the cover in place. The control unit is set by turning the temperature adjusting knob 52 until the indicator arm 160 points to the desired temperature above which the variable air inlet valve 106 will be actuated to operate the pneumatic device.

The control unit 10 is employed in a temperature control system to regulate the temperature in an enclosed space that has pneumatically operable ventilation devices linking the enclosed space with outside air. The control unit controls the operation of the pneumatic ventilation devices by controlling the air pressure supplied to them by the air supply. As shown in FIG. 4, a source of pressurized air, typically an air compressor 142, supplies pressurized air to the control unit 10 through conduit 140, such as ¼" semi-flexible plastic tubing, linking the air compressor to the control unit. The pneumatic devices 134, 136, 138 are connected to the control unit by similar conduit. The pneumatic devices are designed to open to allow the exchange of air between the outside and the enclosed space when the air pressure in the conduit between the control unit and the device is increased. Typically the devices will only open when an opposing closing force acting to maintain the devices in a closed state is overcome by air pressure acting to open the devices located in the conduit between the control unit and the devices. Once open, the devices will only close when the closing force acting to close the devices is greater than the air pressure maintained in the conduit linking the control unit and the devices. The control unit regulates temperature by controlling the amount of air pressure maintained in the conduit linking the control unit to the devices.

The control unit 10 may be employed in a temperature control system that uses air pressure supplied by the compressor 142 to form the opposing closing force. That system would typically be set up as described above with conduit 140 added to link the devices 134, 136, 138 to the air supply as shown in FIG. 4. Pressure regulators 144, 146, 148 located between the air supply and the devices maintain an adjustable closing pressure in the close side conduit of each device. It should be noted that a single regulator could be used to regulate the close side pressure of several devices. By adjusting the regulators, movement of the devices can be controlled to open only when the open side conduit pressure linking the control unit to the devices is greater than the pressure maintained in the close side conduit between the regulators and the devices. Similarly, the devices will close only when the close side pressure is greater than the open side pressure. In a temperature control system having several ventilation devices, each regulated by its own pressure regulator, the regulators can be adjusted so that the devices open in sequence. In that case, the devices set to open at the lowest open side pressure will open first. They will also be the last to close once the open side pressure is reduced. Using a sequencing arrangement, the devices that open first are the primary ventilators and those opening at higher open side pressures are the secondary ventilators.

Optionally, the pneumatic devices employed in a temperature control system as described above may also be spring loaded to open in the event of a system failure. If the devices are spring loaded, they will require less open side pressure to open than those that are not spring loaded since the spring force acts with the open side pressure against the opposing closing force.

The module 92 is provided with an air bleed hole 150 for allowing air to exhaust from the open side conduit to reduce the air pressure in the conduit when the devices close. The air bleed hole links the interior 94 of the module above the diaphragm to the exterior surface 96 of the module as shown in FIGS. 1 and 2. The rod 102 has an L-shaped passageway 154 linking the cavity below the diaphragm to the interior of the module above the diaphragm. The passageway exits through the top of the rod on the surface that engages the piston.

The piston 98 has a disk-shaped seal member 152 on the end which engages the top of the rod. The seal member is larger in diameter than the top of the rod. When the piston is pushing down on the rod such that the rod displaces the valve core 110 to increase the air pressure, an airtight seal is formed by the rod and the seal member to prevent air from traveling through the passageway from below the diaphragm to the interior of the module above the diaphragm. When the piston is not pushing downward on the rod to engage the valve core, air is allowed to travel across the diaphragm through the passageway and out the air bleed hole. With this configuration, air bleeds out from the open side conduit linking the device to the control unit when the ambient air temperature is below the temperature set on the control unit allowing previously opened devices to close.

An example of a temperature control system employing a control unit as described above with three pneumatic ventilation devices set to open sequentially would operate as follows. An air compressor 142 designed to run between 80 and 95 pounds per square inch (p.s.i.) of pressure above ambient pressure is first connected by conduit 140 to the control unit 10. A standard filter/regulator/lubricator 156 unit may be provided between the air compressor and the control unit. This filter unit is added to remove contaminants from the air stream, to regulate outlet pressure from the unit, and to inject oil into the air stream to lubricate the system. An in-line shut-off valve may also be provided between the compressor and the control unit to allow the system pressure to be reduced to zero should a leak develop in the system. The open sides of three pneumatic devices 134, 136, 138 are connected by conduit 140 to the control unit. The close sides are connected by conduit 140 to the air supply line linking the air compressor and the control unit. Separate regulators 144, 146, 148 are provided to regulate the close side pressures to each device. The regulators in this example are set at 40, 50, and 60 p.s.i. for the three devices 134, 136, 138, respectfully. The primary ventilating device 134 is set at 40 p.s.i., the secondary device 136 at 50 p.s.i. and the least used device 138 set at 60 p.s.i. The control unit 10 is then manually set for the desired ambient air temperature above which the devices will begin to open.

Until the control unit 10 senses a temperature above the temperature set on the unit, the pressure in the open side conduit is at ambient air pressure. Once the control unit senses an ambient air temperature greater than the temperature set on the control unit, the receptacle surface 32 moves to displace the variable air inlet valve 106. Since the seal member 152 on the piston 98 forms an air tight seal with the rod 102, air pressure begins to build in the open side conduit. The device 134 set at 40 p.s.i. will not begin to open until the pressure in the open side conduit exceeds 40 p.s.i. If the control unit does not sense an ambient air temperature at or below the temperature set on the control, pressure will continue to build and the first device will continue to open until it is fully open. The second device 136 will then begin to open once the pressure in the open side conduit exceeds 50 p.s.i. It will open fully and pressure will continue to build unless the control senses an ambient air temperature at or below the temperature set on the control. The third device 138 will begin to open once the pressure exceeds 60 p.s.i. in the open side conduit.

Once the control unit 10 senses a decrease in ambient air temperature, to a temperature at or below the temperature set on the control, the rod 102 will lift off the valve core 110 of the variable air inlet valve 106. The piston 98 will be moved upward away from the rod by pressure in the module allowing air to bleed out from the open side conduit through the air bleed hole 150 in the module 92. As the pressure decreases in the open side conduit, the devices will each close at the point when the open side conduit pressure becomes less than the pressure maintained by the regulator in the close side conduit for each device. If the control unit continues to sense an ambient air temperature at or below the temperature set on the control unit, all the devices will close and not begin to reopen until the control unit senses an increase in temperature above the temperature set on the control unit.

In the above example, the control unit may sense an ambient air temperature at or below the temperature set on the control unit at a point when less than all of the devices are fully open. In that case, the open side pressure will begin to decrease, closing those devices that were open or partially open at that time, those being the primary ventilators. Those that were not open, the secondary ventilators, will remain closed. The pressures given herein are examples only and the system disclosed will operate over a wide range of pressures and temperatures, and with minor modification can perform in a wide range of environments and applications.

The invention is not to be construed as limited to the specific embodiment shown in the drawings but is to be limited only by the broad general meanings of the following claims.

I claim:

1. A pneumatic temperature control comprising:
 a frame;
 a fluid receptacle mounted to said frame containing a fluid therein capable of expanding or contracting with temperature, and further having a surface capable of movement responding to said fluid expansion or contraction;
 a spring positioned on said frame to exert a force on said receptacle surface, said spring having adjusting means for selectively controlling the force exerted on said receptacle surface, said force being calibrated to achieve a desired movement of said receptacle surface at a preselected temperature;
 an elongated trigger mounted to said frame having a first end movable by movement of said receptacle surface and a second end movable in response to movement of said first end; and
 a module attached to said frame having air valve means for controlling the flow of air between an air supply port and an air output port, said air valve means in communication with said second end of said trigger, whereby expansion and contraction of said fluid actuates said air valve means to control the flow of air to operate a pneumatic device, said air valve means including a diaphragm fixed to said module, a rod extending through said diaphragm, a first end of said rod being in movable communication with said second end of said trigger, a variable air inlet valve fixed to said module being in communication with a second end of said rod, an air output port in said module, the air flow through said output port being dependent on the displacement of said variable air inlet valve.

2. The control of claim 1, wherein said module has a piston slidably mounted in said module having a first end in communication with said trigger and a second end in communication with said rod, said module further having an air bleed hole linking an interior of said module to an exterior of said module, said rod having an open passageway for air to travel across said diaphragm, said rod forming an air tight seal with said piston when said rod engages said piston preventing the escape of air through said passageway and out said air bleed hole, and said rod permitting air to exhaust through said passageway and out said air bleed hole when said rod is pulled away from said piston.

* * * * *

UNITED STATES PATENT AND TRADEMARK OFFICE
CERTIFICATE OF CORRECTION

PATENT NO. : 5,011,076

DATED : April 30, 1991

INVENTOR(S) : Ike Wurtz

It is certified that error appears in the above-identified patent and that said Letters Patent is hereby corrected as shown below:

Col. 5, Line 40   insert --to-- after the word "enough"

Col. 8, Line 35   insert --,-- after the word "frame"
       Claim 1

Signed and Sealed this

First Day of December, 1992

*Attest:*

DOUGLAS B. COMER

*Attesting Officer*        *Acting Commissioner of Patents and Trademarks*